US007404997B2

(12) United States Patent
Emslander et al.

(10) Patent No.: US 7,404,997 B2
(45) Date of Patent: *Jul. 29, 2008

(54) SUBSTRATES WITH MULTIPLE IMAGES

(75) Inventors: Jeffrey O. Emslander, Afton, MN (US); Kenneth B. Wood, Minneapolis, MN (US); Paul L. Acito, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,173

(22) Filed: Sep. 2, 2004

(65) Prior Publication Data

US 2006/0046033 A1 Mar. 2, 2006

(51) Int. Cl.
*B32B 27/14* (2006.01)
*B32B 3/00* (2006.01)

(52) U.S. Cl. .................... 428/195.1; 428/201; 428/323; 428/412; 428/423.1; 428/480; 428/500

(58) Field of Classification Search .............. 428/195.1, 428/201, 323, 412, 423.1, 480, 500
See application file for complete search history.

(56) References Cited

U.S. PATENT DOCUMENTS

| | | | |
|---|---|---|---|
| 3,247,005 | A | 4/1966 | Parry et al. |
| 3,515,619 | A | 6/1970 | Barnette |
| 3,672,894 | A | 6/1972 | Glenn, Jr. |
| 3,888,029 | A | 6/1975 | Schubert |
| 4,217,378 | A | 8/1980 | Pizur, Sr. |
| 4,605,461 | A | 8/1986 | Ogi |
| 4,673,609 | A | 6/1987 | Hill |
| 4,720,317 | A | 1/1988 | Kuroda et al. |
| 5,142,274 | A | 8/1992 | Murphy et al. |
| 5,142,415 | A | 8/1992 | Koehnle |
| 5,204,160 | A | 4/1993 | Rouser |
| 5,525,177 | A | 6/1996 | Ross |
| 5,571,598 | A | 11/1996 | Butler et al. |
| 5,591,527 | A | 1/1997 | Lu |
| 5,612,119 | A | 3/1997 | Olsen et al. |
| 5,858,155 | A | 1/1999 | Hill |
| 5,872,656 | A | 2/1999 | Horwill et al. |
| 5,925,437 | A | 7/1999 | Nelson |
| 5,939,168 | A | 8/1999 | Andriash |
| 5,962,109 | A | 10/1999 | Schwietz |
| 6,106,922 | A | 8/2000 | Cejka et al. |
| 6,210,776 | B1 | 4/2001 | Hill |
| 6,212,805 | B1 | 4/2001 | Hill |
| RE37,186 | E | 5/2001 | Hill |
| 6,226,906 | B1 | 5/2001 | Bar-Yona |

(Continued)

FOREIGN PATENT DOCUMENTS

| | | |
|---|---|---|
| DE | 28 56 391 | 7/1980 |

(Continued)

*Primary Examiner*—Betelhem Shewareged
(74) *Attorney, Agent, or Firm*—Colene H. Blank

(57) ABSTRACT

The present application is directed to a substrate comprising a first major surface comprising light transmitting areas and light shielding areas. A reflective image exists on the light shielding areas of the first major surface of the substrate. A transmitted image exists on the first major surface through the light transmitting areas of the first major surface of the substrate. The substrate is substantially continuous and not specularly transmissive.

21 Claims, 5 Drawing Sheets

U.S. PATENT DOCUMENTS

| | | | | |
|---|---|---|---|---|
| 6,254,711 | B1 * | 7/2001 | Bull et al. | 156/234 |
| 6,258,429 | B1 | 7/2001 | Nelson | |
| 6,386,699 | B1 | 5/2002 | Ylitalo et al. | |
| 6,506,475 | B1 | 1/2003 | Hill | |
| 6,507,413 | B1 * | 1/2003 | Mueller et al. | 358/1.9 |
| 6,521,325 | B1 | 2/2003 | Engle et al. | |
| 6,577,355 | B1 | 6/2003 | Yaniv | |
| 6,627,286 | B1 | 9/2003 | Lutz | |
| 6,649,249 | B1 | 11/2003 | Engle et al. | |
| 6,650,470 | B1 | 11/2003 | Turner et al. | |
| 6,714,270 | B2 | 3/2004 | Seiki et al. | |
| 7,050,227 | B2 | 5/2006 | Olofson et al. | |
| 7,193,631 | B2 | 3/2007 | Mueller | |
| 2002/0034608 | A1 | 3/2002 | Aeling et al. | |
| 2002/0155952 | A1 | 10/2002 | Furukawa | |
| 2003/0003273 | A1 | 1/2003 | Izutani et al. | |
| 2003/0161017 | A1 | 8/2003 | Hudson et al. | |
| 2003/0215628 | A1 | 11/2003 | Ma et al. | |
| 2004/0090399 | A1 | 5/2004 | Bal-Yona et al. | |
| 2004/0095645 | A1 | 5/2004 | Pellicori et al. | |
| 2004/0126531 | A1 | 7/2004 | Harvey et al. | |
| 2004/0216406 | A1 | 11/2004 | Egashira | |
| 2005/0140927 | A1 | 6/2005 | Aeling et al. | |
| 2005/0270604 | A1 | 12/2005 | Drinkwater | |
| 2006/0017979 | A1 | 1/2006 | Goggins | |
| 2007/0200794 | A1 | 8/2007 | Mueller | |

FOREIGN PATENT DOCUMENTS

| | | |
|---|---|---|
| DE | 3436065 | 4/1986 |
| DE | 29622671 | 6/1997 |
| DE | 19642001 | 4/1998 |
| EP | 0 389 274 | 9/1990 |
| EP | 1 577 358 | 9/2005 |
| GB | 2 358 513 | 7/2001 |
| GB | 2381116 | 4/2003 |
| JP | 2002-296408 | 10/2002 |
| WO | WO 97/47481 | 12/1997 |
| WO | WO 00/74026 | 12/2000 |
| WO | WO 03/034377 | 4/2003 |
| WO | WO 2004/042684 | 5/2004 |
| WO | WO 2004/044875 | 5/2004 |
| WO | WO 2005/005162 | 1/2005 |

* cited by examiner

SUBSTRATES WITH MULTIPLE IMAGES

FIELD

The present application is related to substrates having light transmitting areas and light shielding areas.

BACKGROUND

The design and production of unidirectional graphic articles is known and described, for example in U.S. Pat. No. 6,254,711 entitled "Method for Making Unidirectional Graphic Article" and assigned to the same assignee as the instant application.

While unidirectional graphic articles are useful in a number of display environments, these articles typically provide only one display option, for example a reflected image in a first lighting condition. That is, an image can be seen (from the viewing side of the article) in high brightness conditions such as daylight, and the image is not visible (from the viewing side of the article) in low brightness conditions such as nighttime.

Dual display films and systems are also described in the art, to provide multiple display options. That is, a film capable of showing a reflected image in a first lighting condition and a transmitted image or series of images in a second lighting condition. Examples of such films are shown, for example, in U.S. Pat. Nos. 3,888,029; 5,962,109; 6,226,906; 6,577,355; and publication numbers WO 2004042684, WO9747481, and US 20040090399.

SUMMARY

However, previous dual display films and systems have a low image quality, especially when viewed close to the film. Also, many dual display systems are electronic, creating a difficulty when used outdoors. The present application is directed to a dual substrate that has high image quality, and allows for both static and active images. Additionally, a multiple display with limited electronic parts is desirable.

The present application is directed to a substrate comprising a first major surface comprising light transmitting areas and light shielding areas. A reflective image exists on the light shielding areas of the first major surface of the substrate. A transmitted image exists on the first major surface through the light transmitting areas of the first major surface of the substrate. The substrate is substantially continuous and not specularly transmissive.

DETAILED DESCRIPTION

Figure 1:
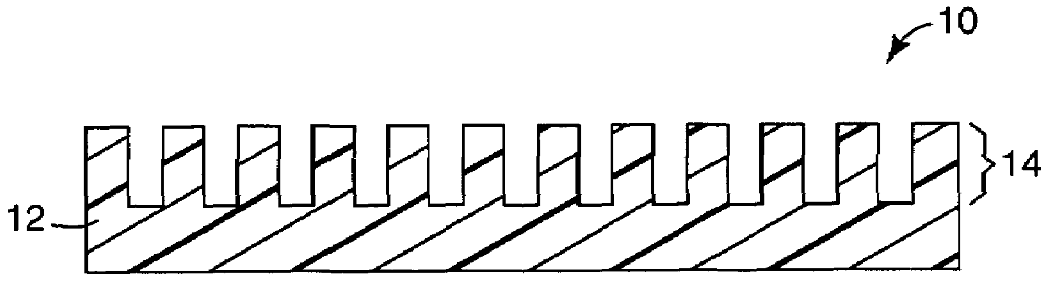
FIG. 1 is a cross sectional view of a film representing an embodiment of the present invention.

For the purpose of the present application, the following terms are defined.

An image may comprise a solid color field, a likeness of something (which may include many colors, e.g. a square, a car or a pattern,) or combinations thereof.

A color includes black, white, and any color within the visible spectrum of colors.

The present application is directed to substrates. Specifically, display substrates that are capable of providing a dual functionality. For example, a first major surface of a substrate having dual functionality capability may have a first appearance in a first lighting condition (e.g. a front light condition), and a second appearance in a second lighting condition (e.g. a back light condition), when viewed from the same side of the film (i.e. viewed on the first major surface). Generally, the substrate as a whole is not a specularly transmissive i.e. a viewer is unable to view through the substrate, from either side, to see something on the other side.

Generally, a reflective image creates the first appearance of the substrate. Generally, in a first lighting condition with the light source on the same side of the substrate as the first major surface (i.e. reflected light or front light), the reflective image will become a visible reflected image. A reflective image may include a likeness of something and/or a solid color field. The solid color can be a coating on the film or a color additive within the film.

Generally, a transmitted image creates the second appearance of the substrate. A transmitted image exists on the second major surface of the substrate opposite the first major surface, and is visible on the first major surface in a second lighting condition. A second lighting condition is, for example, light from an illumination source, i.e. the illumination source is on the opposite side of the substrate from viewer (i.e. transmitted light or back light.) A transmitted image may include a likeness of something, a transmitted light and/or a solid color field. The illumination source may be, for example lightbulbs, light emitting diodes, photoluminescent films, electroluminescent films, etc.

Generally, in a front light or reflected light condition, the reflective image is visible and the transmitted image is not visible. Generally, in a back light or transmitted light condition, the transmitted image is visible and the reflective image is not visible. In some lighting conditions, both the reflective image and the transmitted image are visible, to some extent, over all or part of the display.

The substrates described herein generally comprise light transmitting areas and light shielding areas. The properties of the light shielding areas and light transmitting areas are chosen to maximize the appearance of the reflective image and the transmitted image given the particular viewing conditions and desired visual effect. The light shielding areas block more transmitted light than the light transmitting areas.

In certain embodiments, the light transmitting areas are transparent or clear areas within the substrate. In other embodiments, the light transmitting areas are translucent areas within the substrate.

In some embodiments, the light shielding areas are opaque. The light shielding areas can be formed in the substrate by any means. Generally, the light shielding areas are formed either on a film using a light shielding layer or in a film using a light shielding additive. The light shielding area may also be mirror like, if the light shielding area is sufficiently specularly reflective. Light shielding layers include, for example, pigmented coating, metallic flakes, metallized coatings, double sided mirrors, etc. Light shielding additives include any opacifying filler, for example titanium dioxide, carbon black, calcium carbonate, metallic flakes, etc. Combinations and blends of additives and layers can also be used.

In certain embodiments, the light shielding areas are formed from a light shielding additive within a film. For example, a film has a light shielding additive within the film, creating a light shielding film. The light transmitting areas with such an embodiment may be formed by thinning the film in defined areas to allow the film to become light transmitting in those areas, even with the presence of the light shielding additive in the thin areas.

The substrate therefore has a certain planar area that is light transmitting within the plane of the first major surface. The area of the substrate that is light transmitting is generally less than about 90%, for example less than about 50%. In certain embodiments, the area of the substrate that is light transmitting is less than about 25%, for example less than about 15%. In specific embodiments, the area of the substrate that is light transmitting is greater than about 0.5%, for example greater than 1%.

The reflective image is generally created on the light shielding areas of a first major surface of the substrate. For example, the reflective image may result from a coating of pigmented ink on top of the light shielding areas. In certain embodiments, the pigmented ink has enough opacity to itself be a light shielding layer, and the coating of the ink creates the light shielding areas. In other embodiments, the ink is depositing on top of a separate light shielding layer. The reflective image may also be formed on the second major surface and viewable from the first major surface, creating light shielding areas. In such an embodiment, the pigmented ink is placed on the light shielding areas, and an optional light shielding layer is placed on top of the pigmented ink, opposite the first major surface.

The substrate also generally comprises a transmitted image. The transmitted image is generally created on the light transmitting areas of the second major surface of the substrate opposite the first major surface. The transmitted image may also be created by a printed image on the second major surface of the substrate. In other embodiments, the transmitted image is created by a projected light or image on the second major surface of the substrate. The projected image may be active or static. In another embodiment, the transmitted image is created using a transmissive film layer proximate the second major surface, and the transmitted image is on the transmissive film. The transmissive film may be, for example, a transparency film or a translucent film.

The substrate may act as a diffuser screen and be configured in a manner known in the art to receive a projected image or series of images from a projector and to display those images for viewing by viewer. The substrate may act as a diffuser screen by virtue of the materials used, e.g. a sufficient haze in the film used in the substrate, or with certain additives added to the film, for example titania, to diffuse light in the substrate.

In some embodiments, the first major surface of the substrate is a structured surface. In some embodiments, the second major surface of the substrate, opposite the first major surface, is a structured surface. In some embodiments, both major surfaces are structured.

A structured surface is a surface having deviations from planarity. Generally, the structured surface comprises a series of features, or deviations from planarity. The features may be any geometric shape. Examples of feature shapes include ridges, posts, pyramids, hemispheres and cones. The features may be protrusion features, i.e. they protrude out of the surface. In other embodiments, the features are recessed features, i.e. they recess within the surface. The protrusion features may have flat tops, pointed tops, truncated tops or rounded tops. The recessed features may have flat bases, pointed bases, truncated bases or rounded bases. The sides of any feature may be angled or perpendicular to the surface. In some embodiments, secondary features may exist on or within the features.

In some embodiments, the structured surface may have a pattern. The pattern can be regular, random, or a combination of the two. "Regular" means that the pattern is planned and reproducible. "Random" means one or more features of the structure are varied in a non-regular manner. Examples of features that are varied include for example, feature pitch, peak-to valley distance, depth, height, wall angle, edge radius, and the like. Combination patterns may for example comprise patterns that are random over a defined area, but these random patterns can be reproduced over larger distances within the overall pattern.

In some embodiments, the features may touch adjacent features at the plane (e.g. the base of a protrusion feature or the top of a recessed feature.)

In certain embodiments, the structured surface comprises a series of microstructure features. A microstructure feature is a feature having at least two lateral dimensions (i.e. dimensions in the plane of the film) less than 55 mils (1.4 mm). The feature can be either a protrusion feature or a recessed feature. In some embodiments, the microstructure feature has at least one, for example two, lateral dimensions less than 40 mils (1.02 mm), for example less than 25 mils (635 micrometers). In specific embodiments, the microstructure feature has at least one, for example two, lateral dimensions less than 10 mils (254 micrometers). In certain embodiments, the microstructure feature has at least one, for example two, lateral dimensions greater than 1 micrometer, for example greater than 25 micrometer.

In certain embodiments, the first major surface defines a series of micro through-holes. A hole travels from the first major surface of the substrate to the second major surface of the substrate. A micro through-hole is a hole having at least two lateral dimensions (i.e. dimensions in the plane of the film) less than 55 mils (1.4 mm). In some embodiments, the micro through-holes have at least one, for example two, lateral dimensions less than 40 Mil (1.02 mm), for example less than 25 mil (635 micrometers). In specific embodiments, the micro through-holes have at least one, for example two, lateral dimensions less than 10 mil (254 micrometers). In certain embodiments, the micro through-holes have at least one, for example two, lateral dimensions greater than 1 micrometer, for example greater than 25 micrometer.

In certain embodiments, the substrate is substantially continuous. Substantially continuous means, for the purpose of the present application, that the planar area of he substrate has less than 10% of the surface area removed by holes that travel from the first major surface of the substrate to the second major surface of the substrate.

The substrate generally includes at least one film layer. Generally, the film is a polymeric material. Suitable polymeric materials include, for example, polyolefinic materials (e.g. polypropylene or polyethylene), modified polyolefinic material, polyvinyl chloride, polycarbonate, polystyrene, polyester, polyvinylidene fluoride, (meth)acrylics (e.g. polymethyl methacrylate), urethanes, and acrylic urethane, ethylene vinyl acetate copolymers, acrylate-modified ethylene vinyl acetate polymers, ethylene acrylic acid copolymers, nylon, and engineering polymers such as polyketones or polymethylpentanes. The film may also be an elastomer. Elastomers include, for example, natural or synthetic rubber, styrene block copolymers containing isoprene, butadiene, or ethylene (butylene) blocks, metallocene-catalyzed polyolefins, polyurethanes, and polydiorganosiloxanes. Mixtures of the polymers and/or elastomers may also be used.

The film may comprise additives. Examples of such additives include, without limitation, stabilizers, ultraviolet absorbers, matting agents, optical brighteners and combinations to provide a desired physical or optical benefit.

The substrate may be a multilayer structure. In some embodiments, the structure features may be a separate layer from a base film layer. In some embodiments, the multilayer substrate may be a combination of light shielding film layers and light transmitting film layers, where the light shielding film layer possesses light transmitting areas.

In certain embodiments, the substrate comprises an image reception layer on at least one surface for receiving the reflected or transmitted image. In certain embodiments, the image reception layer may also serve as the light shielding layer. The composition of the image reception layer should be compatible with the desired imaging method (for example screen printing, ink jet printing, etc.). Generally, the image reception layer includes an ethylene vinyl acetate polymer (EVA), more preferably, an acid- or acid/acrylate-modified EVA polymer, or a carbon monoxide-modified EVA polymer, polyvinyl chloride, urethanes, (meth)acrylics, acrylic urethanes or combinations thereof.

Generally, the image reception layer is on the light shielding areas of the substrate. In such an embodiment, the image reception layer may also be the light shielding layer. In other embodiments, a light shielding layer is on the light shielding areas between the substrate surface and the image reception layer. In specific examples, the light transmitting areas are substantially free of the image reception layer.

In some embodiments, the substrate comprises a low energy surface layer on top of light transmitting areas. The low energy surface layer serves to reduce the wetting of any image to the light transmitting area. Examples of the low energy surface layer include, for example, silicones.

In other embodiments, the substrate comprises a weak boundary layer, for example a release coating, on top of light transmitting areas. A coating on the surface of the substrate would not adhere to the weak boundary layer. Therefore, the weak boundary layer serves to assist in clearing any coating from the light transmitting areas, thereby enhancing the light transmitting capability. Examples of a weak boundary layer include waxes, cellulosic layers, and low molecular weight silicones.

In some embodiments, the substrate comprises an adhesive layer. The adhesive layer may be on either the first major surface or the second major surface. In certain embodiments, the adhesive layer is over an image layer, either the reflective image or the transmitted image. A release liner may also cover the adhesive layer prior to use. Examples of suitable adhesives include (meth)acrylic adhesives, styrene block copolymer adhesives, and natural rubber resin adhesives, along with any optional tackifier, plasticizer or crosslinker. Examples of suitable release liners include silicone coated paper and polyester.

FIG. 1 represents a film for use in an embodiment of the present invention. The substrate 10 comprises a film 12. The substrate 10 has a first major surface 14. In the embodiment shown in FIG. 1, the first major surface 14 comprises a structure. The structure may be, for example, a microstructure.

Figure 2:
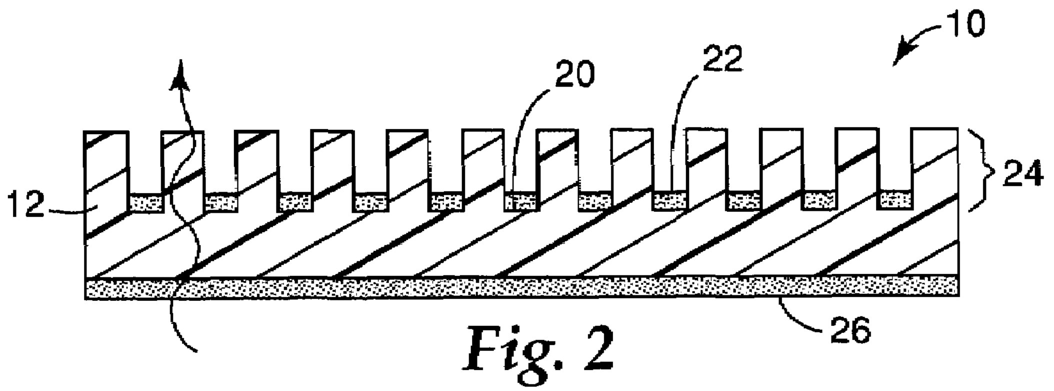
FIG. 2 is a cross sectional view of the film in FIG. 1 with multiple images.

FIG. 2 represents a modification of the embodiment of FIG. 1. FIG. 2 shows a light shielding coating 20 on the surface of the film 12. The light shielding coating 20 creates light shielding areas 22 and light transmitting areas 24. Light is shown, as a wavy line, transmitting through the light transmitting areas 24. As stated above, in some embodiments, the light shielding coating may be an opaque layer, and an image layer would be formed on the light shielding coating. In other embodiments, the light shielding layer is an ink having sufficient opacity to create the light shielding areas which creates the reflective image. In other embodiments, the light shielding layer is an ink having sufficient opacity to create the light shielding areas which creates the reflective image. Additionally, FIG. 2 shows an embodiment of an image layer 26 on the second major surface of the substrate. Image layer 26 creates a transmitted image.

Figure 3:
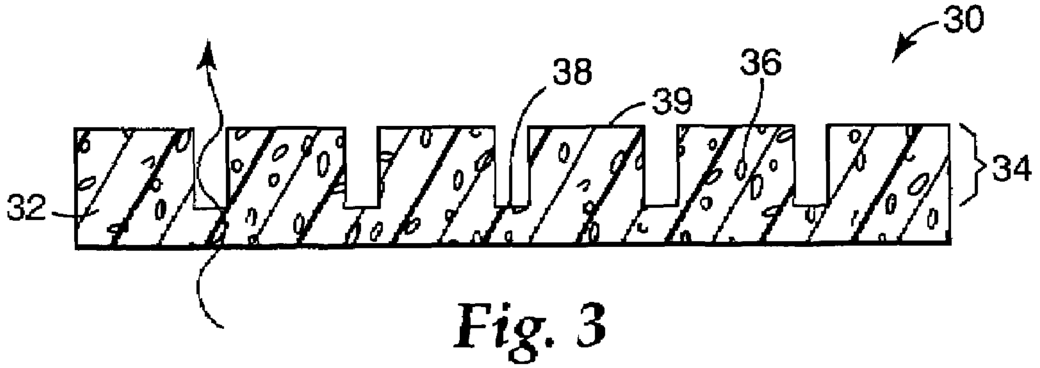
FIG. 3 is a cross sectional view of a film representing a second embodiment of the present invention.

FIG. 3 represents a film for use in an embodiment of the present invention. The substrate 30 comprises a film 32. The substrate 30 has a first major surface 34. In the embodiment shown in FIG. 3, the first major surface 34 comprises a structure. The structure may be, for example, a microstructure. The film 32 additionally comprises a light shielding additive 36. The structure and the light shielding additive creates light transmitting areas 38 and light shielding areas 39. In this embodiment, the structure thins the film in the light transmitting areas enough to allow the film to become light transmitting. The light transmitting areas 38 are generally depressions within the film 32. Light is shown, as a wavy line, transmitting through the light transmitting areas 38.

Figure 4:
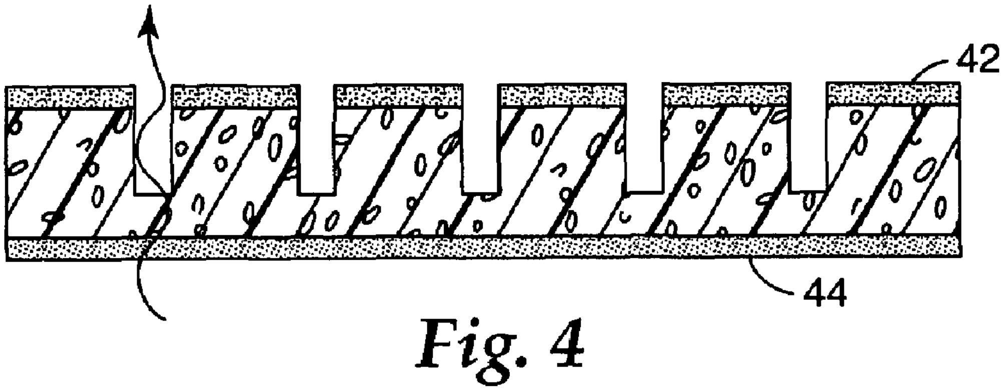
FIG. 4 is a cross sectional view of the film in FIG. 3 with multiple images

FIG. 4 represents a modification of the embodiment of FIG. 3. FIG. 4 shows an image layer 42 on the surface of the film 32. The image layer 42 generally creates a reflective image. Additionally, FIG. 4 shows an image layer 44 on the second major surface of the substrate. Image layer 44 creates a transmitted image.

Figure 5:
FIG. 5 is a cross sectional view of a film representing a third embodiment of the present invention.

FIG. 5 represents a film for use in an embodiment of the present invention. The film 52 comprises a series of through holes 54.

Figure 6:
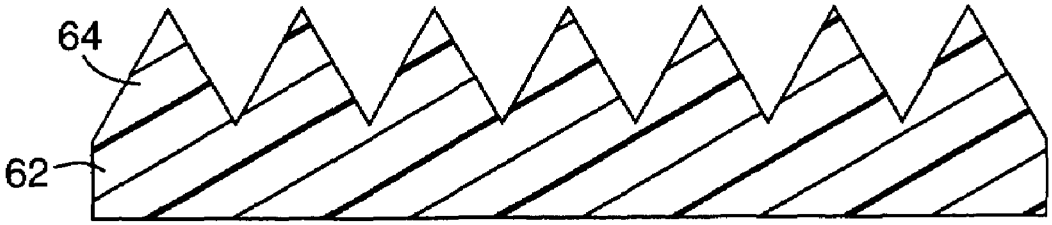
FIG. 6 is a cross sectional view of a film representing a fourth embodiment of the present invention.

FIG. 6 represents a film 62 for use in an embodiment of the present invention. The film comprises a structured surface 64. The structured surface comprises a series of pyramids.

The substrate can be manufactured using a variety of methods. In one embodiment, the film may be a light transmitting film. The light transmitting film is then coated with a light shielding substance, which may ultimately be an image. The coating methods include screen printing, rotary screen, gravure printing, etc. The coated surface is then structured. The surface may be structured using a variety of methods, including, for example, embossing.

In other embodiments, the film is a light shielding film, and a surface of the film is structured to leave thin enough portions to provide light transmitting areas. In such embodiments, the film may be structured using a cast film extrusion process or cure process in addition to embossing.

In other embodiments, the film may be a light transmitting film. The film is structured. The light transmitting film is then coated with a light shielding coatings, and the light shielding coating is then removed from the protrusions of the first major surface. The removal may be during the coating process or after complete coating. In some embodiments, the light shielding coating is removed manually, for example by abrading, and in other embodiments, the light transmitting areas repel the light shielding coating and any ink. In some embodiments, the light shielding coating is ink alone, and in other embodiments ink is coated over the light shielding coating.

In other embodiments, a film forming material is coated onto a structured surface to form a film. The film is removed from the structured surface to provide a film having a structured surface. The film is then coated on the film's structured surface with a light shielding coating and the light shielding substance is cleared from the light transmitting areas. The film forming material may also comprise a light shielding additive.

An additional method of manufacturing the substrate comprises coating a light shielding layer on at least a portion of a structured surface. A film forming material is then coated onto the structured surface to form a film. The film and the light shielding layer are removed from the tops of the structured surface to form a film having a structured surface with light shielding areas.

The substrate can be used in a variety of methods. Generally, an illumination source is provided. A substantially continuous substrate is placed between the illumination source and the viewer, wherein the substrate comprises light shielding areas and light transmitting areas. In other embodiments, substrate has a series of micro through-holes having at least two lateral dimensions less than 55 mil.

A reflective image exists on the substrate opposite the illumination source and a transmitted image exists between the substrate and the illumination source. The reflective image is visible with the illumination source off and the transmitted image is visible with the illumination source on. For example, the reflective image may be a printed image, and the transmitted image may be a printed image, an image on a transparency or a projected image as discussed above.

Generally, the reflective image is visible only when illuminated light source is off, and the transmitted image is visible only when illuminated light source is on.

The substrate is useful in a variety of applications. For example, the substrate may have a reflective image that is a solid color. The solid color may match a surrounding environment and camouflage a transmitted image, which is only visible when the illumination source is on. One specific example includes camouflaging the brake lights of an automobile, or camouflaging the interior overheads lights of an automobile. Warning, cautionary, directional and advertisement signs could also be camouflaged until needed.

Another application is in dual graphics or signage. The substrate may have a reflective visual image that imparts signage information. This sign would then be visible in a front light condition. The sign could then be easily changed to a different sign in a back light condition. For example, a static sign displays during the day (front light) and at night, a projected active sign is the transmitted image on the same substrate.

The following examples further disclose embodiments of the invention.

EXAMPLES

Comparative Example A

A piece of red film (commercially available under the tradename 3M 3635 Dual Color Film from 3M Co., Saint Paul, Minn.) was printed with a black ink (commercially available under the tradename 3M SCOTCHCAL 1905) using a 230 mesh "ABC" test pattern screen and air dried for 24 hours. The resulting film had a red appearance with a black "ABC" test pattern interrupted by the perforated holes in the film. The printed film was then trimmed to a size of 10 cm×15 cm.

Figure 7A:
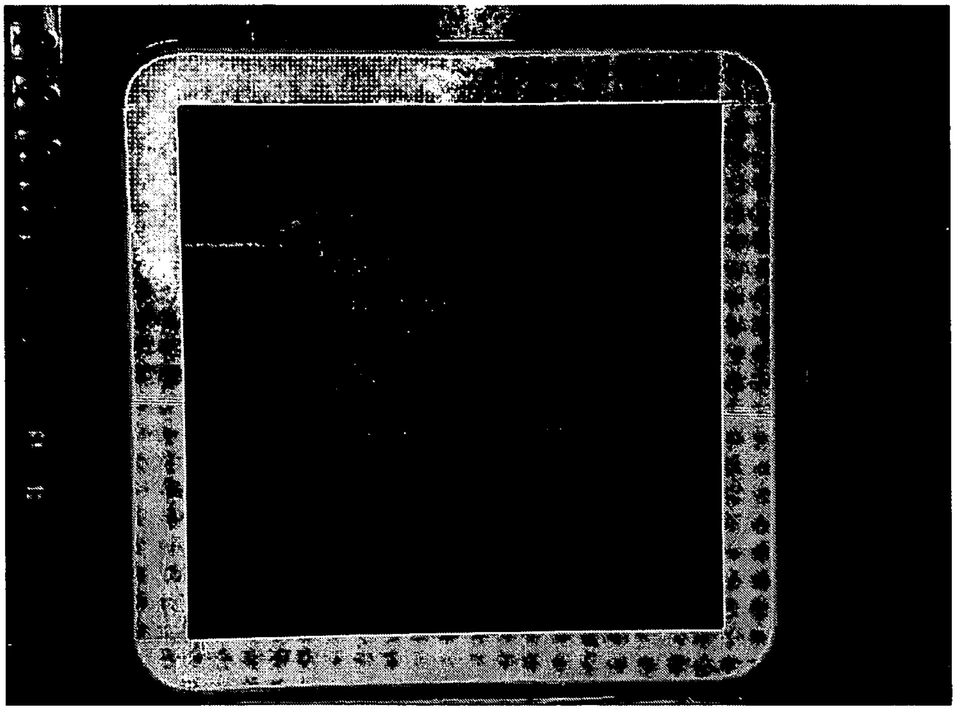
FIGS. 7*a* and 7*b* are digital images of an elevated view of a prior art film.

Next, a piece of 3M Ink, Jet Transparency Film #CG3460 was printed with an image of an automobile using a Hewlett Packard DeskJet 810C ink jet printer. After air drying the image was trimmed to a size of 10 cm×15 cm. The image of the automobile was then placed on a 30 cm×30 cm piece of clear Kelvx sheeting 37 microns thick. The printed image of the automobile was bonded to the Kelvx by applying strips of 3M #232 masking tape around the perimeter of the transparency film. Next, a 10 cm×25 cm piece of the screenprinted Dual Color Film was applied directly over the image of the automobile with the printed "ABC" text facing upward. 3M 3635-22B blockout film was then applied to the Kelvx sheeting around the perimeter of the microstructured film/transparency and the resulting composite was placed into a light box. When viewed under frontlight conditions with the light box turned off the surface appeared red with the "ABC" test text visible but disrupted by the perforations in the Dual Color Film (FIG. 7*a*).

Figure 7B:
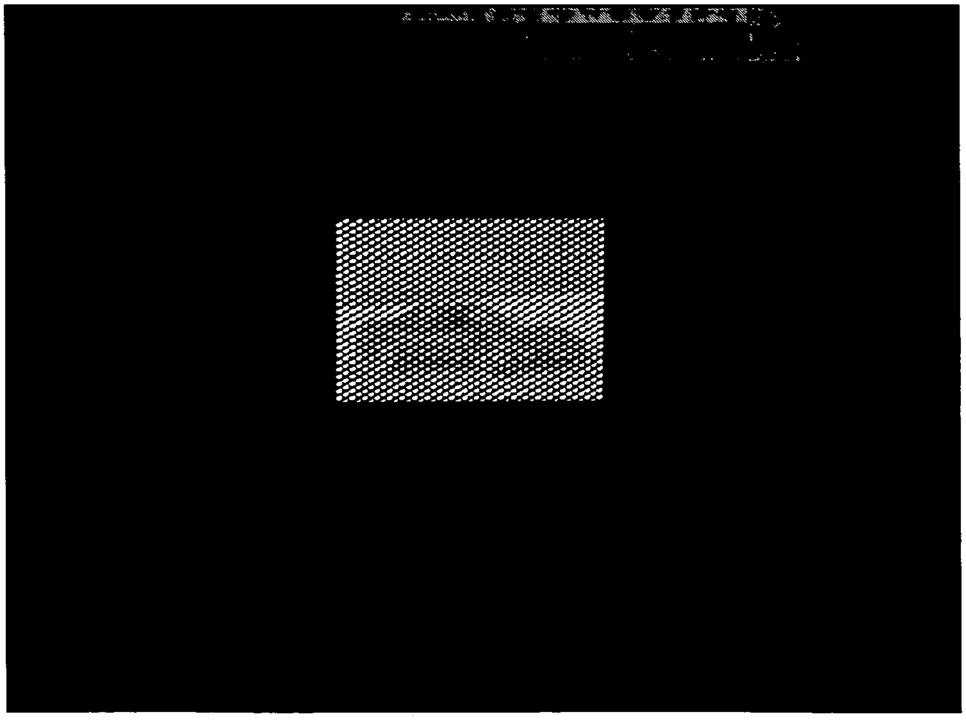

When placed in a darkened room with the light box turned off the "ABC" text was again visible. When the light box was turned on, an image of the automobile immediately became visible but the image was difficult to resolve due to the coarse hole pattern of the Dual Color Film (FIG. 7*b*).

Example 1

A piece of unprinted 22 centimeter×30 centimeter film sold under the tradename 3M PRECISE MOUSING SURFACE FILM (available from 3M Company, St. Paul, Minn.) having a pyramidal microstructure was screenprinted on the microstructured side using ink sold under the tradename 3M SCOTCHCAL 1905 black screenprint ink (available from 3M Company, St. Paul, Minn.) diluted per manufacturers specification (620 grams ink, 120 grams thinner) using a 157 mesh floodcoat screen. After air drying for 24 hours the film was then printed again over the black ink using orange screenprint ink sold under the tradename 3M SCOTCHCAL 1933 ink (commercially available from 3M Company, St. Paul, Minn.) diluted to manufacturers specification using a 157 mesh floodcoat screen. After air drying for 24 hours the material was printed with the black ink using a 230 mesh "ABC" test pattern screen and air dried for 24 hours. The resulting film had an orange appearance with a black "ABC" test pattern present when viewed from the microstructured side. When held to back light, light transmitting areas were visible. Because of gravity and the screenprint process, the ink flowed down the pyramid and was thicker in the valleys between the pyramids, resulting in the tops of the pyramids becoming light transmitting areas and the valleys becoming light shielding areas. The film was then trimmed to a size of 10 cm×15 cm.

Next, a piece of transparent film sold under the tradename 3M Ink Jet Transparency Film #CG3460 was printed with an image of an automobile using a Hewlett Packard DeskJet 810C ink jet printer. After air drying the image was trimmed to a size of 10 cm×15 cm. The image of the automobile was then placed on a 30 cm×30 cm piece of 37 micron thick clear sheeting sold under the tradename KELVX, available from Eastman Chemical Corp. (Kingsport, Tenn.). The printed image of the automobile was bonded to the clear sheeting by applying strips of 3M #232 masking tape around the perimeter of the transparency film. Next, a 10 cm×25 cm piece of the printed film was applied directly over the image of the automobile with the printed microstructure surface facing upward (smooth side of film in contact with transparency film) and held in place by applying strips of masking tape around the perimeter of the material. A light blocking film was then applied to the sheeting around the perimeter of the microstructured film/transparency. The resulting composite was placed into a light box (Luminaire Ultra II manufactured by Clearr Corporation, Minnetonka, Minn.). When viewed under front light conditions with the light box turned off the surface appeared orange with the "ABC" test text visible.

When placed in a darkened room with the light box turned off the "ABC" text was again visible. When the light box was turned on, the image of the automobile immediately became visible with a slight "ghost" image of the "ABC" text present.

Example 2

Figure 8A:
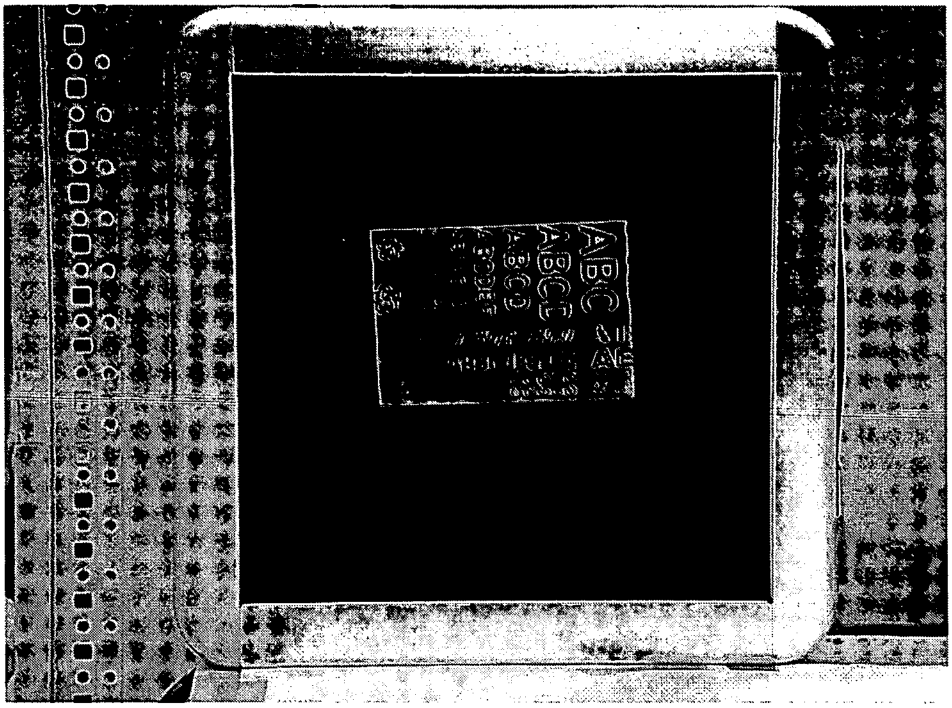
FIGS. 8*a* and 8*b* are digital images of an elevated view of a film representing an embodiment of the invention.

The construction of Example #1 was produced and after being placed in the lightbox the film was lightly abraded on the microstructured side using abrasive sheeting sold under the tradename 3M 413Q 600 grit WETORDRY TRI-M-ITE (available from 3M Company, St. Paul, Minn.) to enhance the light transmitting areas. When viewed under front light conditions with the light box turned off the surface appeared orange with the "ABC" test text visible (FIG. 8*a*)

Figure 8B:
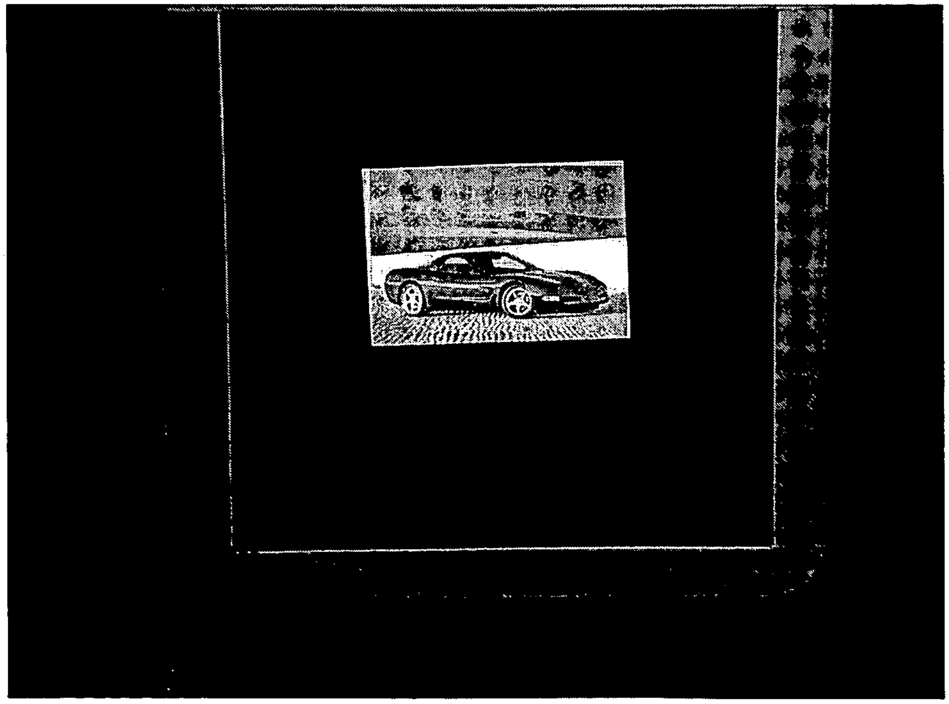

When placed in a darkened room with the light box turned off the "ABC" text was again visible. When the light box was turned on, the image of the automobile immediately became visible and the "ghost" image of the "ABC" text was not present (FIG. 8*b*).

Example 3

Example 1 was repeated with the following exceptions. Instead of using a transparency as the transmitted image, the printed film was screenprinted on the backside with ink sold under the tradename 3M SCOTCHCAL 1916 blue screenprint ink (Available from 3M Company, St. Paul, Minn.) using a 230 mesh "ABC" test pattern screen. The film was then trimmed to a size of 10 cm×15 cm.

The resulting printed film was placed into the light box. When viewed under daylight conditions with the light box turned off the surface appeared orange with the "ABC" test text visible.

When placed in a darkened room with the light box turned off the black "ABC" text was again visible against the orange background. When the light box was turned on, a reverse image of the backside blue "ABC" text test pattern immediately became visible with a slight "ghost" image of the frontside black "ABC" text present.

Example 4

The construction of Example 3 was produced and after being placed in the lightbox the film was lightly abraded on the microstructured side using the abrasive sheeting. When viewed under daylight conditions with the light box turned off the surface appeared orange with the black "ABC" test text visible.

When placed in a darkened room with the light box turned off the black "ABC" text was again visible against the orange background. When the light box was turned on, the image of the reverse image of the backside blue "ABC" text immediately became visible against and the "ghost" image of the frontside black "ABC" text was not present.

Example 5

Film substrates bearing recessed features with thin skins were produced via polymer melt processing methods, using a single screw extruder operated at conditions typical for extrusion of polypropylene. A metal roll was provided bearing posts that were designed so as to impart the desired feature structure to the film. The posts were provided such that at the skinned terminus of each feature, the diameter of the feature was approximately 5 mils (125 micrometer). The post spacing was 50 mils (1.25 mm) center to center on a hexagonal array. Thus, the corresponding percentage area of the thin-skinned regions (as a percentage of the total film surface area) was approximately 0.9%. The posts were somewhat tapered such that for a 15 mils (375 micrometers) film thickness, the % area occupied by the open end of the cavities (at the opposite surface from the skinned side), was approximately 5% of the total surface area of the film. Thus, the remaining (printable) surface area on the open-cavity surface of the film was ~95%.

The process was carried out by extruding molten polypropylene resin available under the tradename ATOFINA 3868 (commercially available from AtoFina, Houston, Tex.) into a nip between the post-bearing roll and a steel backing roll, with a 3 mil (75 micrometer) thick layer of polyester (commercially available under the tradename MYLAR D from Dupont, Wilmington Del.) used as a backing film (which was removed and discarded immediately after use). The post roll was pressurized against the backing film/backing roll combination such that in the resulting structured film product, the thin skin that remained at the termination of each feature was approximately 0.5 to 2 mils (10 to 50 micrometers) in thickness.

Such films were made with white (light-scattering) additive (titanium dioxide, Clariant P-White 2%), and with black (light-absorbing) additive (Clariant PP-Black 1%), in the form of concentrates in polypropylene. The concentrates were added to the base polymer resin at amounts between 10 and 50 weight % in the case of the white concentrate, and between 2 and 15 weight % in the case of the black concentrate. For the white concentrate, it was found that, at loadings as high as 50 weight % of concentrate, the thin-skinned areas of the film were still significantly transmissive to light upon visual inspection. However, it was found that even at 50% white concentrate, at the bulk film thickness used (15 mils), the bulk film was still somewhat transmissive to light. For the black concentrate, it was found that, at loadings as high as 15 weight % concentrate, the thin-skinned areas of the film were still transmissive to light upon visual inspection. At this additive loading and at 15 mil bulk film thickness, the bulk film was completely opaque to light.

Samples of the structured film with 15% black concentrate were used for printing studies. Images were deposited on the front (ambient-light) surface of the film via screen printing of a typical white solvent-based screen printing ink. By using a 380 mesh screen, ink deposition was largely confined to the surface of the film, with minimal encroachment of the ink into the holes. Images were placed on the back side of the structured film by means of cutting out pieces of colored, light transmissive films bearing pressure-sensitive adhesive, and laminating these films directly to the skinned side of the structured film.

Image-bearing films as produced above were placed on a light box, with the skinned side (bearing the color-transmissive pieces) facing into the light box, and the open hole side (bearing the white front-side images) facing out. The border of the light box surrounding the film sample was masked off with opaque film.

Upon visualization from straight ahead under conditions of normal lighting (i.e., the light level present in a typical office environment) the front side images were easily visible, with the backside images being completely invisible. When the light box was illuminated from within, the backlit color images were now visible, with the front side images being significantly faded but still visible.

Figure 9A:
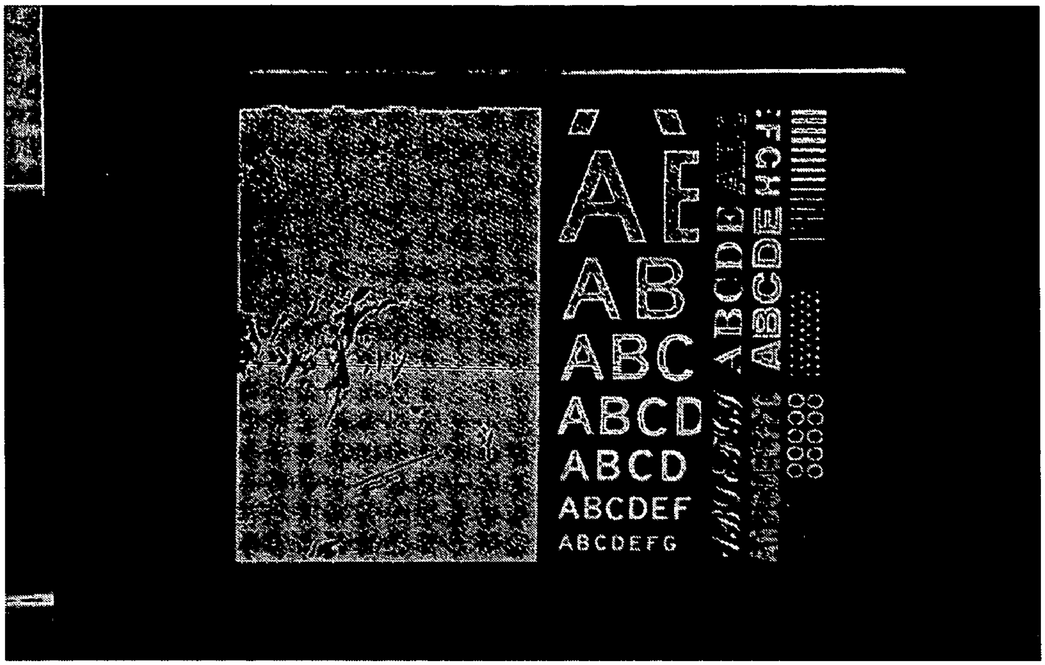
FIGS. 9*a* and 9*b* are digital images of an elevated view of a film representing an embodiment of the invention.
Figure 9B:
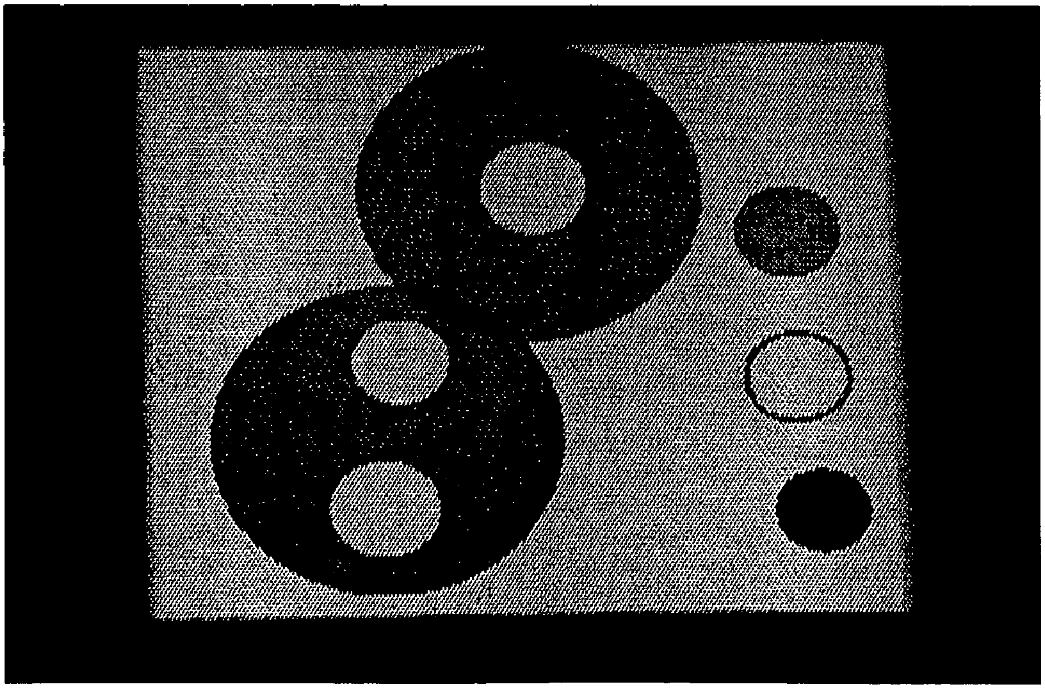

Under slightly lower light conditions (i.e. with the adjustable light level dimmed to approximately one-half of full) the front side images were still easily visible, with the backside images being completely invisible. (FIG. 9*a*) When the light box was illuminated from within, the backlit color images were now visible, with the front side images disappearing from view. Under these conditions the backlit images completely dominated the visualized appearance. (FIG. 9*b*)

Example 6

A film was prepared as in Example 5 with the following exceptions. A metal roll was provided bearing posts that were designed so as to impart the desired feature structure to the film. The posts were square in cross section and were provided such that at the skinned terminus of each recessed feature, the lateral dimensions of the feature were 10 mils (0.25 mm) by 10 mils. The post spacing was 29.7 mils (0.74 mm) center to center on a square array. Thus, the corresponding percentage area of the thin-skinned regions (as a percentage of the total film surface area) was approximately 11.3%. The posts were 20 mils (0.5 mm) in height. The posts were somewhat tapered such that for a 20 mil film thickness, the % area occupied by the open end of the cavities (at the opposite surface from the skinned side), was approximately 15% of the total surface area of the film. Thus, the remaining (printable) surface area on the open-cavity surface of the film was ~85%.

The process was carried out by extruding molten polypropylene resin (commercially available under the tradename 3868 from AtoFina, Houston, Tex.) into a nip between the post-bearing roll and a steel backing roll, with a 3.8 mil (97 micrometer) thick layer of low-haze polyester (commercially available from 3M Company, St. Paul, Minn.) used as a backing film (which was removed and discarded immediately after use). The post roll was pressurized against the backing film/backing roll combination such that in the resulting structured film product, the thin skin that remained at the termination of each recessed feature was approximately 0.5 to 2 mils (10 to 50 micrometers) in thickness. The thickness of the bulk film was approximately 20 mils (0.5 mm).

Such films were made with blends of white, light-scattering titanium-dioxide additive (commercially available under the tradename P-White 2% from Clariant Corporation), and with black, light-absorbing carbon-black additive (commercially available under the tradename PP-Black 1% from Clariant Corporation), in the form of concentrates in polypropylene. For example, films were made using 30% by weight white additive and 1.0 to 1.5 weight % of black additive (the base polymer thus comprising 68.5-69% by weight of the total). Such films proved to be opaque in the bulk regions of the film while still permitting excellent light transmission in the thin-skinned regions.

Additional films were made using the above base polymer and additives in a multilayer format. For example, films were made, using standard multilayer polymer extrusion techniques, comprising white outer layers surrounding an opacifying core layer. In a typical construction, the film comprised an outer layer of 10 mils (0.25 mm) thickness on the skinned side, with 30% white additive, an outer layer of 4 mils (100 microns) thickness with 30% white additive on the open-hole side, and a core layer of 6 mils (150 microns) thickness with 30% white additive and 10% black additive (the balance of the core layer thus being 60% base polymer), sandwiched in between the two outer layers. The core layer was opaque except where interrupted by the cavities imparted by the posts. In this way, films were produced that were opaque and had extremely white outer surfaces (in contrast to the light gray films previously described).

Both the light gray films and the white multilayer films were printed with visual images on the open-hole side via the screen printing techniques described in Example 5, with blue ink being used as opposed to white. Color layers were then placed on the skinned side of the films via the methods described in Example 5.

Upon visualization from straight ahead under conditions of normal lighting (i.e., the light level present in a typical office environment) the front side images were easily visible, with the backside images being completely invisible. When the light box was illuminated from within, the backlit color images were now visible, with the front side images being significantly faded but still visible.

Under semi-darkened light conditions the front side images were still visible, with the backside images being completely invisible. When the light box was illuminated from within under such conditions, the backlit color images were now visible, with the front side images disappearing from view. Under these conditions the backlit images completely dominated the visualized appearance.

Example 7-9

The films detailed below were embossed with one of two plates. Plate 1 had a structure with posts having a 125 micrometer diameter, a height of 150 micrometers and a pitch of 860 micrometers. Plate 2 had a structure with dots having a 250 micrometer diameter, a height of 150 micrometers and a pitch of 860 micrometers.

| Example | Film |
|---|---|
| 7 | 2 mil black vinyl with 1 mil of acrylic adhesive on a 3.8 mil release liner was provided and was directly embossed on the major surface opposite the adhesive coating. |
| 8 | 2 mil mirror gold film (vapor coated) composed of a dual layer of 20/80 polyvinlyidene fluoride/acrylic and 80/20-acrylic/polyvinlyidene fluoride films, 1 mil of acrylic adhesive and a 3.8 mil release liner was directly embossed on the major surface opposite the adhesive coating. |
| 9 | 4 mil dual layer white black film on adhesive coated paper liner. For this example adhesive coated fill was transferred to a 3.8 mil PET release liner was directly embossed on the major surface opposite the adhesive coating. |

Each film was placed in contact with the plates, with the pattern in contact with the film and run through a nip. The pressure was set at 70 PSI (0.48 MPa), temperatures varied from 300-325° F. (148.9-162.8° C.) on the steel roll and speed ranged from 0.5 to 1.5 FPM. The films were embossed resulting in thin areas at the base of the hole allowing higher light transmission. The preferred orientation was the plate being next to the heated roll then the film with the liner on the bottom. PET backing worked better than paper release liner. In the case of the metalized films, the vapor-coated layer was highly distorted creating open areas in the clear polymer. All samples demonstrated enhanced light transmission.

Example 10

A film was manufactured using direct casting of polymer solution on patterned release liner. A polyvinyl chloride vinyl organosol was cast on a structured polyvinyl chloride release liner to form posts or holes.

The organosol was knife coated on the liner. The sample was placed in a 120F degree oven for 30 seconds, followed by a 200° F. (93° C.) degree oven for 30 seconds, followed by a 275° F. (135° C.) degree oven for 30 seconds followed by a 375° F. (190° C.) degree oven for 45 seconds. Sample was then allowed to cool and the vinyl film was peeled from the casting liner resulting in holes about 5 mils (0.127 mm) in depth at a pitch of 8 mils (0.203 mm).

Comparative Example B

Dual Color Rear Projection

The film of Comparative Example A was trimmed to a size of 30 cm×30 cm. A computer driven test image was projected using a 3M MP7760 multimedia projector in a darkened room. The projector was focused to minimal viewing distance. The printed film described above was place in the path of the projected image with the non-printed side facing the projector. No image was visible from the projector, the light passed through the holes and only the bright light of the projector bulb was visible through the holes Example 11

A piece of unprinted 22 centimeter×30 centimeter 3M Precise™ Mousing Surface Film (3M Company, St. Paul, Minn.) having a pyramidal microstructure was screenprinted on the microstructured side using 3M Scotchcal 1905 black screenprint ink diluted per manufacturers specification (620 grams 1905 ink, 120 grams 3M CGS-50 thinner) using a 157 mesh floodcoat screen. After air drying for 24 hours the film was then printed again over the black ink using 3M Scotchcal 1933 orange screenprint ink diluted to manufacturers specification using a 157 mesh floodcoat screen. After air drying for 24 hours the material was printed with 3M Scotchcal 1905 black ink using a 230 mesh "ABC" test pattern screen and air dried for 24 hours. The resulting film had an orange appearance with a black "ABC" test pattern present when viewed from the microstructured side.

A computer driven test image was projected using a 3M MP7760 multimedia projector in a darkened room. The projector was focused to minimal viewing distance. The printed film described above was place in the path of the projected image with the smooth, non-printed side facing the projector. The test video image was visible from the printed microstructure side and at a distance of approximately 1.5 meters the video image came into focus very clearly, with some ghost image of the "ABC" text visible.

Example 12

The test film in Example 10 was abraded with 3M 413Q 600 grit Wetordry™ Tri-M-ite™ abrasive sheeting on the microstructured side. The "ABC" text remained clearly visible against the orange background when viewed under reflective light conditions. When the film was placed in the path of the projected image as described in Example #1, the test video was clearly visible in reverse with reduced ghosting of the "ABC" text when viewed on the microstructured side.

Various modifications and alterations of the present invention will become apparent to those skilled in the art without departing from the spirit and scope of the invention.

What is claimed is:

1. A substrate comprising a first major surface comprising light transmitting areas and light shielding areas, and a second major surface opposite the first major surface, at least one of the first major surface and the second major surface being structured;

a reflective image on the light shielding areas of the first major surface of the substrate, the reflective image being visible only when illumination is provided from a side adjacent the first major surface of the substrate; and a transmitted image on the first major surface through the light transmitting areas of the first major surface of the substrate, the transmitted image being visible only when illumination is provided from a side adjacent the second major surface of the substrate;

wherein the substrate is substantially continuous and not specularly transmissive.

2. The substrate of claim 1 wherein the substrate is a multilayer substrate.

3. The substrate of claim 1 wherein the first major surface comprises a film.

4. The substrate of claim 3 wherein the film is a light transmitting material.

5. The substrate of claim 4 wherein the film comprises a light shielding additive in the light shielding areas.

6. The substrate of claim 4 wherein the film is coated with a light shielding coating to form the light shielding areas.

7. The substrate of claim 3 wherein the film is a light shielding material.

8. The substrate of claim 7 wherein the film is thinner in the light transmitting areas than the light shielding areas.

9. The substrate of claim 3 wherein the film is a polymer.

10. The substrate of claim 9 wherein the film is a material selected from the group consisting of polyolefinic material, modified polyolefinic material, polyvinyl chloride, polycarbonate, polystyrene, polyester, polyvinylidene fluoride, acrylic, urethane, acrylic urethane and combinations of two or more of the foregoing.

11. The film of claim 1 wherein the first major surface comprises less than about 50% light transmitting areas.

12. The substrate of claim 3 wherein the film comprises a stabilizer.

13. The substrate of claim 1 wherein the transmitted image is a projected image on the second major surface of the film opposite the first major surface.

14. The substrate of claim 13 wherein the projected image is active.

15. The substrate of claim 13 wherein the projected image is static.

16. The substrate of claim 1 comprising a transmissive film layer proximate the second major surface, wherein the transmitted image is on the transmissive film.

17. The substrate of claim 1 wherein the second major surface is structured.

18. The substrate of claim 1 wherein the light shielding areas on the first major surface of the substrate are specularly reflective.

19. The substrate of claim 18 wherein metal flakes are on the light shielding areas.

20. The substrate of claim 18 wherein mirrors are on the light shielding areas.

21. The substrate of claim 18 wherein two sided mirrors are on the light shielding areas.

* * * * *

UNITED STATES PATENT AND TRADEMARK OFFICE
CERTIFICATE OF CORRECTION

PATENT NO. : 7,404,997 B2
APPLICATION NO. : 10/933173
DATED : July 29, 2008
INVENTOR(S) : Jeffrey O. Emslander It is certified that error appears in the above-identified patent and that said Letters Patent is hereby corrected as shown below:

Column 1,
Line 59, After "images" insert -- . --.

Column 4,
Line 55, After "area of" delete "he" and insert -- the --, therefor.

Column 5,
Line 26, Delete "acid/acrylate-modified" and insert -- acid/acrylate- modified --, therefor.

Column 7,
Line 65, After "Ink" delete ",".

Column 9,
Line 18, After "(FIG. 8a)" insert -- . --.

Column 11,
Line 8, After "(FIG. 9b)" insert -- . --.

Column 12,
Line 44, Delete "polyvinlyidene" and insert -- polyvinylidene --, therefor.
Line 45, Delete "polyvinlyidene" and insert -- polyvinylidene --, therefor.

Column 13,
Line 27, After "holes" insert -- . --.

Signed and Sealed this

Eighteenth Day of November, 2008

Jon W. Dudas

JON W. DUDAS
*Director of the United States Patent and Trademark Office*